(12) United States Patent
Glenat et al.

(10) Patent No.: US 12,066,301 B1
(45) Date of Patent: Aug. 20, 2024

(54) DEVICE ORIENTATION CALIBRATION SYSTEM

(71) Applicant: Samsara Inc., San Francisco, CA (US)

(72) Inventors: Lucas Glenat, Le Gua (FR); Eric Klaus Allseits, Altamonte Springs, FL (US); John Charles Bicket, Burlingame, CA (US); Justin Pan, San Francisco, CA (US); Glen Phillip McGillan, San Francisco, CA (US); Kevin Lloyd, San Carlos, CA (US)

(73) Assignee: Samsara Inc., San Francisco, CA (US)

( * ) Notice: Subject to any disclaimer, the term of this patent is extended or adjusted under 35 U.S.C. 154(b) by 132 days.

(21) Appl. No.: 17/934,797

(22) Filed: Sep. 23, 2022

Related U.S. Application Data

(60) Provisional application No. 63/363,895, filed on Apr. 29, 2022.

(51) Int. Cl.
*G01C 25/00* (2006.01)
*G01C 21/16* (2006.01)

(52) U.S. Cl.
CPC .......... *G01C 25/005* (2013.01); *G01C 21/16* (2013.01)

(58) Field of Classification Search
None
See application file for complete search history.

(56) References Cited

U.S. PATENT DOCUMENTS

| | | | |
|---|---|---|---|
| 2013/0081442 A1* | 4/2013 | Basir | G01C 25/00 73/1.38 |
| 2022/0074967 A1* | 3/2022 | Hochi | G01S 19/40 |

* cited by examiner

*Primary Examiner* — Lisa M Caputo
*Assistant Examiner* — Cynthia L Davis
(74) *Attorney, Agent, or Firm* — Schwegman Lundberg & Woessner, P.A.

(57) ABSTRACT

A device orientation calibration system to perform operations that include: accessing inertial measurement unit (IMU) data generated by an IMU mounted upon an object that corresponds with a first reference frame, the IMU data indicating a second reference frame that comprises a Z-axis, a Y-axis, and an X-axis; performing a calibration of the IMU data to align the second reference frame of the IMU with the first reference frame of the object, the performing the calibration comprising: determining a gravitational vector based on a first portion of the IMU data; applying a first rotation to the IMU data to align the Z-axis of the second reference frame with the gravitational vector; determining a forward motion vector based on a second portion of the IMU data; and applying a second rotation to the IMU data to align the X-axis of the second reference frame with the forward motion vector.

17 Claims, 9 Drawing Sheets

300

ACCESSING IMU DATA GENERATED BY AN IMU MOUNTED UPON A VEHICLE THAT CORRESONDS WITH A FIRST REFERENCE FRAME, THE IMU DATA INDICATING A SECOND REFERENCE FRAME THAT COMPRISES A Z-AXIS, A Y-AXIS, AND AN X-AXIS
302

PERFORMING A CALIBRATION OF THE IMU DATA TO ALIGN THE SECOND REFERENCE FRAME OF THE IMU WITH THE FIRST REFERENCE FRAME OF THE VEHICLE, THE PERFORMING THE CALIBRATION COMPRISING:
304

DETERMINING A GRAVITATIONAL VECTOR BASED ON A FIRST PORTION OF THE IMU DATA
306

APPLYING A FIRST ROTATION TO THE IMU DATA TO ALIGN THE Z-AXIS OF THE SECOND REFERENCE FRAME WITH THE GRAVITATIONAL VECTOR
308

DETERMINING A FORWARD MOTION VECTOR BASED ON A SECOND PORTION OF THE IMU DATA
310

APPLYING A SECOND ROTATION TO THE IMU DATA TO ALIGN THE X-AXIS OF THE SECOND REFERENCE FRAME WITH THE FORWARD MOTION VECTOR
312

FIG. 3

500

ACCESSING IMU DATA, WHEREIN A PORTION OF THE IMU DATA COMPRISES GYROSCOPE DATA AND ACCELEROMETER DATA, THE GYROSCOPE DATA COMPRISING LEFT TURN SAMPLES AND RIGHT TURN SAMPLES
502

PERFORMING A LINEAR REGRESSION UPON A FIRST SET OF DATA POINTS FROM AMONG THE ACCELEROMETER DATA TO GENERATE A VECTOR
504

DETERMINING A FORWARD DIRECTION OF THE VECTOR BASED ON VALUES OF THE LEFT TURN SAMPLES AND THE RIGHT TURN SAMPLES
506

ACCESSING IMU DATA, WHEREIN A PORTION OF THE IMU DATA COMPRISES GYROSCOPE DATA COMPRISING LEFT TURN SAMPLES THAT CORRESPOND WITH A POSITIVE VALUE, AND RIGHT TURN SAMPLES THAT CORRESPOND WITH A NEGATIVE VALUE
602

DETERMINING A YAW ANGLE RELATIVE TO A Z-AXIS OF A REFERENCE FRAME BASED ON THE POSITIVE VALUE AND THE NEGATIVE VALUE
604

DETERMINING A FORWARD DIRECTION BASED ON THE YAW ANGLE
606

FIG. 6

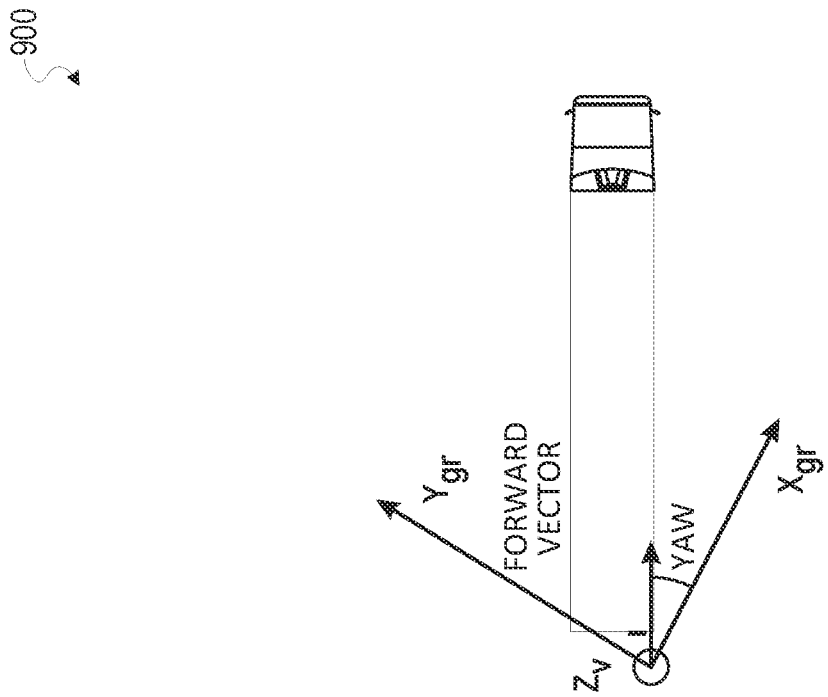
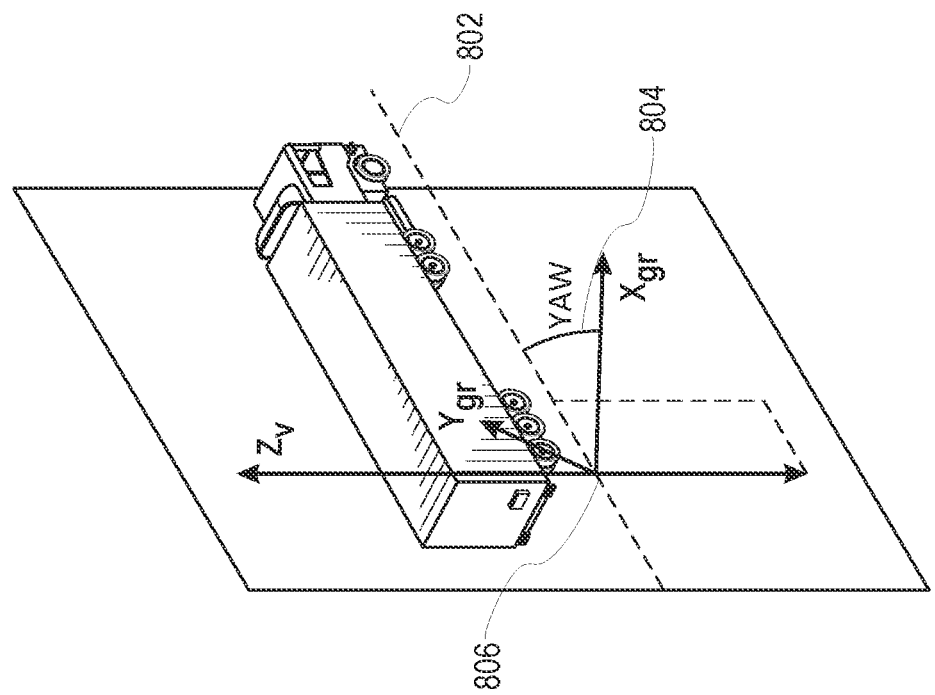
FIG. 8

DEVICE ORIENTATION CALIBRATION SYSTEM

PRIORITY APPLICATION

This application claims priority to U.S. Provisional Patent Application Ser. No. 63/363,895 filed on Apr. 29, 2022, the disclosure of which is incorporated by reference herein in its entirety.

TECHNICAL FIELD

Embodiments of the present disclosure relate generally the field of devices incorporating Inertial Measurement Units (IMU), and more specifically, to calibration of such devices.

BACKGROUND

An inertial measurement unit (IMU) is an electronic device that measures and reports a body's specific force, angular rate, and sometimes the orientation of the body, using a combination of accelerometers, gyroscopes, and sometimes magnetometers. IMU are often integrated into GPS based automotive navigation systems or vehicle tracking systems, giving the system a dead reckoning capability and the ability to gather as much accurate data as possible about the vehicle's current speed, turn rate, heading, inclination and acceleration, in combination with the vehicle's wheel speed sensor output and, if available, reverse gear signal, for purposes such as better traffic collision analysis.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 is a flowchart depicting a method of calibrating an Inertial Measurement Unit (IMU), according to certain example embodiments.

FIG. 5 is a flowchart depicting a method of calibrating an IMU, according to certain example embodiments.

FIG. 6 is a diagram depicting a reference frame of an IMU relative to a reference frame of a vehicle, according to certain example embodiments.

FIG. 8 is a diagram depicting a rotation applied to a reference frame of an IMU, according to certain example embodiments.

DETAILED DESCRIPTION

Figure 1:
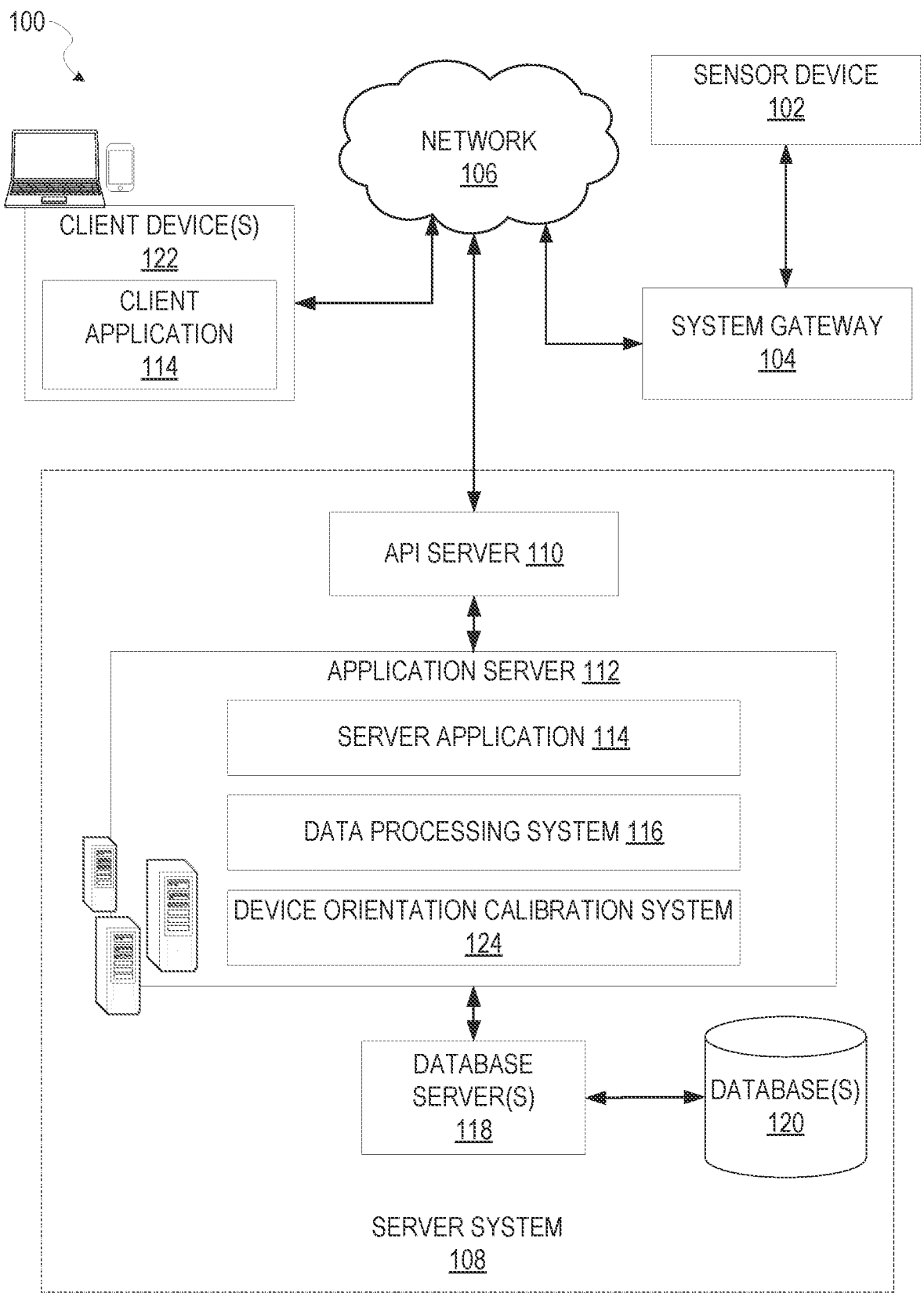
FIG. 1 is a block diagram showing an example system for exchanging data (e.g., sensor data and associated content) over a network in accordance with some embodiments, wherein the system includes an air quality sensor system.

As discussed above, IMU are often integrated into GPS based automotive navigation systems or vehicle tracking systems, in order to provide such systems with the most accurate data as possible about the vehicle's current speed, turn rate, heading, inclination and acceleration, for purposes such as better traffic collision analysis. An issue in implementing such systems is that without a consistent and reliable determination of device orientation, certain events may be mis-classified, resulting in incorrect notifications and alerts. Moreover, existing systems that utilize IMU require the IMU to be mounted in predefined and known orientations, which may sometimes be fixed. For example, if the orientation of the device is off from its expected orientation by 90 degrees, lateral movement may be mis-classified as acceleration. Similarly, if the orientation of the device is off by 180 degrees, braking events may be mis-classified as acceleration. Accordingly, if the IMU is skewed by even a small amount from its expected orientation, any movement detected by the IMU may be mis-classified resulting in inconsistencies.

Accordingly, a system to calibrate device orientation of an IMU is disclosed herein. According to certain example embodiments, a device orientation calibration system may be configured to perform operations that include: accessing inertial measurement unit (IMU) data generated by an IMU mounted upon an object that corresponds with a first reference frame, the IMU data indicating a second reference frame that comprises a Z-axis, a Y-axis, and an X-axis; performing a calibration of the IMU data to align the second reference frame of the IMU with the first reference frame of the object, the performing the calibration comprising: determining a gravitational vector based on a first portion of the IMU data; applying a first rotation to the IMU data to align the Z-axis of the second reference frame with the gravitational vector; determining a forward motion vector based on a second portion of the IMU data; and applying a second rotation to the IMU data to align the X-axis of the second reference frame with the forward motion vector.

In some embodiments, the IMU (i.e., the first sensor device) may be mounted upon a surface of an object, such as a vehicle, or shipping container. For example, the IMU may include a device that includes a number of different sensors configured to detect linear acceleration and rotational rate. For example, the IMU may comprise one or more of an accelerometer and a gyroscope.

The IMU may be affixed to a surface of an object, such that the IMU may be oriented on its own reference plane which may differ from that of the object's own reference plane relative to the ground. For example, the IMU may be mounted vertically, horizontally, or upside-down, and as a result, a reference plane associated with the IMU, which comprises an X-axis, Y-axis, and Z-axis, may differ significantly from a reference plane associated with the object.

In some embodiments, the device orientation calibration system may be configured to determine a reference plane associated with the object and a reference plane associated with the IMU responsive to the occurrence of some trigger event. For example, the trigger event may include one or more of: detecting motion by one or more of the sensor devices associated with the object; detecting an ignition associated with a vehicle in which the IMU is mounted; determining that the object or vehicle in which the IMU is mounted upon has entered into a location encompassed by a geo-fence; determining that a period of time has expired; and receiving a request from a client device to determine a reference plane.

Responsive to detecting the trigger event, the device orientation calibration system may determine a gravitational vector based on attributes of the IMU data. For example, the gravitational vector may be identified among the IMU data based on an expected value of the gravitational vector. Upon determining the gravitational vector based on the portion of the IMU data, the device orientation calibration system may apply a correction to the IMU data, to rotate the IMU data such that a Z-axis corresponding with the IMU data aligns with the gravitational vector.

Having rotated the IMU data based on the gravitational vector coordinates, the device orientation calibration system accesses a portion of the acceleration data and gyroscope data from among the IMU data in order to determine a forward motion vector associated with the object in which the IMU is mounted. For example, the system may identify a subset of the acceleration data and gyroscope data that corresponds to "useful driving events," based on attributes of the acceleration data and gyroscope data.

In some embodiments, the device orientation calibration system may access a set of data points that correspond with accelerometer data and perform one or more operations upon the set of data points in order to generate a vector. For example, in some embodiments, the device orientation calibration system may perform a linear regression operation upon the set of data points in order to generate the vector. While the vector generated based on the set of data points may indicate an X-axis corresponding with a reference plane of the object, a further operation may be required to determine a direction of motion (i.e., the direction of forward motion).

Accordingly, in some embodiments, the device orientation calibration system may access the gyroscope data, wherein the gyroscope data comprises left turn samples that correspond with a positive value, such as a positive value of the rotational speed about the Z-axis after the 3-axis gyroscope data has been gravity-oriented, and right turn samples that correspond with a negative value. The device orientation calibration system may determine a yaw angle relative to the X-axis, and based on the yaw angle, may determine a forward direction associated with the vector. Upon determining the forward direction of the vector, a further corrective rotation may be applied to the IMU data in order to align the IMU data with a reference plane of the object. For example, the system may determine a forward and a backward direction of the X-axis vector, and based on this oriented X-axis vector, may compute a yaw angle, wherein the yaw angle is the angle between the oriented vector and the X-axis of the IMU reference frame after gravity rotation. That yaw angle may thereby be applied as a final rotation of the reference frame in order to produce a fully oriented reference frame.

FIG. 1 is a block diagram showing an example system 100 for determining device orientation, according to certain example embodiments. The system 100 includes one or more client devices 122 that host a number of applications including a client application 114.

Accordingly, each client application 114 is able to communicate and exchange data with another client application 114 and with the server application 114 executed at the server system 108 via the network 106. The data exchanged between client applications 114, and between a client application 114 and the server system 108, includes functions (e.g., commands to invoke functions) as well as payload data (e.g., text, audio, video or other multimedia data).

The server system 108 provides server-side functionality via the network 106 to a particular client application 114, and in some embodiments to the IMU device 102 and the system gateway 104. While certain functions of the system 100 are described herein as being performed by either a client application 114, the IMU device 102, the system gateway 104, or by the server system 108, it will be appreciated that the location of certain functionality either within the client application 114 or the server system 108 is a design choice. For example, it may be technically preferable to initially deploy certain technology and functionality within the server system 108, but to later migrate this technology and functionality to the client application 114, or one or more processors of the IMU device 102, or system gateway 104, where there may be sufficient processing capacity.

The server system 108 supports various services and operations that are provided to the client application 114. Such operations include transmitting data to, receiving data from, and processing data generated by the client application 114, the IMU device 102, and the system gateway 104. In some embodiments, the IMU device 102 may include an odometer associated with a vehicle, as well as a GPS associated with the vehicle. In some embodiments, this data includes, message content, device information, geolocation information, persistence conditions, social network information, sensor data, and live event information, as examples. In other embodiments, other data is used. Data exchanges within the system 100 are invoked and controlled through functions available via graphical user interfaces (GUIs) of the client application 114.

Turning now specifically to the server system 108, an Application Program Interface (API) server 110 is coupled to, and provides a programmatic interface to, an application server 112. The application server 112 is communicatively coupled to a database server 118, which facilitates access to a database 120 that stores data associated with data generated by the IMU device 102 and processed by the application server 112.

Dealing specifically with the API server 110, this server receives and transmits data (e.g., sensor data, commands, and payloads) between the client device 122 and the application server 112. Specifically, the API server 110 provides a set of interfaces (e.g., routines and protocols) that can be called or queried by the client application 114 in order to invoke functionality of the application server 112. The API server 110 exposes various functions supported by the application server 112, including account registration, login functionality, the transmission of data, via the application server 112, from a particular client application 114 to another client application 114, the sending of sensor data (e.g., images, video, geolocation data, inertial data, temperature data, etc.) from a client application 114 to the server application 114, and for possible access by another client application 114, the setting of a collection of data, the retrieval of such collections, the retrieval of data, and the location of devices within a region.

The application server 112 hosts a number of applications and subsystems, including a server application 114, and a device orientation calibration system 124. According to certain example embodiments, the device orientation calibration system 124 is configured to perform operations that include: accessing inertial measurement unit (IMU) data generated by an IMU mounted upon an object that corresponds with a first reference frame, the IMU data indicating a second reference frame that comprises a Z-axis, a Y-axis, and an X-axis; performing a calibration of the IMU data to align the second reference frame of the IMU with the first reference frame of the object, the performing the calibration comprising: determining a gravitational vector based on a first portion of the IMU data; applying a first rotation to the IMU data to align the Z-axis of the second reference frame with the gravitational vector; determining a forward motion vector based on a second portion of the IMU data; and applying a second rotation to the IMU data to align the X-axis of the second reference frame with the forward motion vector. Further details of the device orientation calibration system 124 can be found in FIG. 2 below.

The server application 114 implements a number of data processing technologies and functions, particularly related to the aggregation and other processing of data (e.g., sensor data generated by the IMU device 102). As will be described in further detail, the sensor data, including temporal data, asset status data, and GPS data points, generated by the IMU device 102 may be aggregated into collections associated with a particular user account. Other processor and memory intensive processing of data may also be performed server-side by the server application 114, in view of the hardware requirements for such processing.

The application server 112 is communicatively coupled to a database server 118, which facilitates access to a database 120 in which is stored data associated with sensor data generated by the IMU device 102 and processed by the server application 114.

Figure 2:
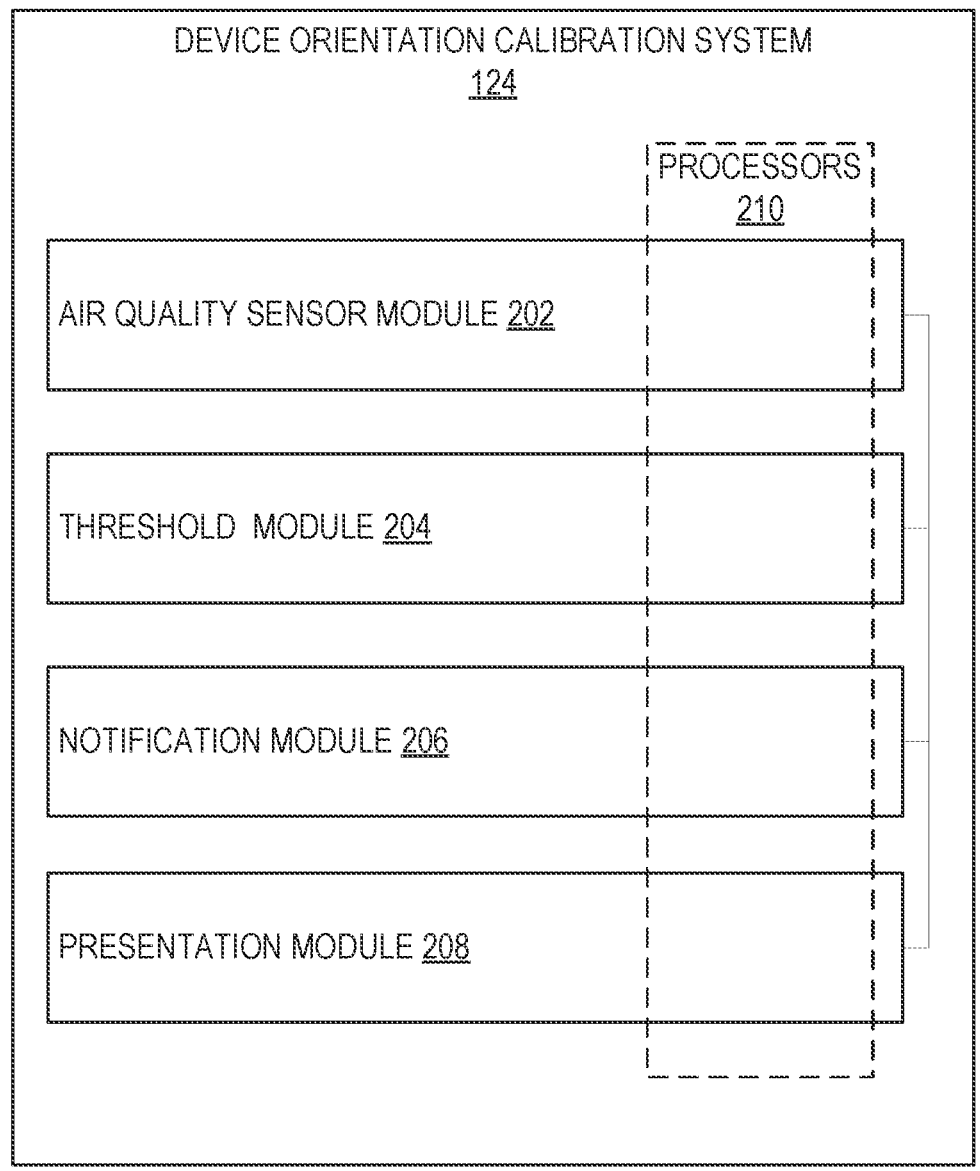
FIG. 2 is a block diagram illustrating various modules of a device orientation calibration system, according to certain example embodiments.

FIG. 2 is a block diagram 200 illustrating components of the device orientation calibration system 124 that configure the device orientation calibration system 124 to perform operations to correct, according to some example embodiments.

The device orientation calibration system 124 is shown as including an IMU data module 202, a calibration module 204, and a trigger event detection module 206, all configured to communicate with each other (e.g., via a bus, shared memory, or a switch). Any one or more of these modules may be implemented using one or more processors 208 (e.g., by configuring such one or more processors to perform functions described for that module) and hence may include one or more of the processors 208.

Any one or more of the modules described may be implemented using hardware alone (e.g., one or more of the processors 208 of a machine) or a combination of hardware and software. For example, any module described of the device orientation calibration system 124 may physically include an arrangement of one or more of the processors 208 (e.g., a subset of or among the one or more processors of the machine) configured to perform the operations described herein for that module. As another example, any module of the device orientation calibration system 124 may include software, hardware, or both, that configure an arrangement of one or more processors 208 (e.g., among the one or more processors of the machine) to perform the operations described herein for that module. Accordingly, different modules of the device orientation calibration system 124 may include and configure different arrangements of such processors 208 or a single arrangement of such processors 208 at different points in time. Moreover, any two or more modules of the device orientation calibration system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 3 is a flowchart depicting a method 300 of calibrating an IMU device 102, according to certain example embodiments. Operations of the method 300 may be performed by the modules described above with respect to FIG. 2. As shown in FIG. 3, the method 300 includes one or more operations 302, 304, 306, 308, 310, and 312.

At operation 302, the IMU data module 202 accesses IMU data generated by an IMU 102, wherein the IMU 102 is mounted upon an object, such as a vehicle. The IMU data generated by the IMU 102 may indicate a reference frame associated with the IMU 102, wherein an X-axis, Y-axis, and Z-axis associated with the reference frame of the IMU 102 may be based upon how the IMU 102 is mounted upon the object. The object may itself correspond with a reference plane relative to the ground, which differs from the reference plane of the IMU 102. As a result, the IMU data generated by the IMU 102 may not appropriately represent motion of the object.

At operation 304, the calibration module 204 may perform a calibration upon the IMU data generated by the IMU 102, in order to align the reference frame associated with the IMU 102 with the reference frame of the object. Accordingly, at operation 306, the IMU data module 202 determines a gravitational vector based on a portion of the IMU data, based on attributes of the IMU data. For example, the IMU data module 202 may identify a force vector represented by the IMU data that matches with an expected value of the gravitational vector.

At operation 306, the calibration module 204 applies a rotation to the IMU data to align the Z-axis of the IMU reference frame with the detected gravitational vector.

Responsive to rotating the IMU data based on the gravitational vector, at operation 310, the IMU data module 202 may determine a forward motion vector based on a portion of the IMU data generated by the IMU device 102. The method 500 depicted in FIG. 5 provides further detail regarding how a forward motion vector may be determined based on a portion of the IMU data.

At operation 312, the calibration module 204 applies a rotation to the IMU data to align the X-axis of the reference frame associated with the IMU 102 with the forward motion vector.

Figure 4:
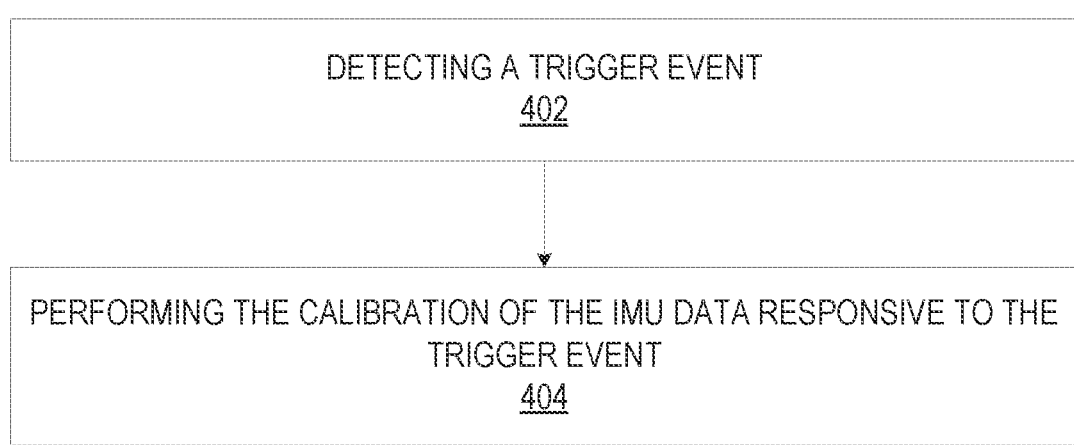
FIG. 4 is a flowchart depicting a method of calibrating an IMU, according to certain example embodiments.

FIG. 4 is a flowchart depicting a method 400 of calibrating an IMU device 102, according to certain example embodiments. Operations of the method 400 may be performed by the modules described above with respect to FIG. 2. In some embodiments, the method 400 may be performed as a subroutine of one or more operations of the method 300, such as operation 304. As shown in FIG. 4, the method 400 includes one or more operations 402, and 404.

In some embodiments, the device orientation calibration system 124 may be configured to perform a calibration upon an IMU device upon detecting a trigger event. Accordingly, at operation 402, the trigger event module 206 detects a trigger event. For example, the trigger event may include: detecting a start, or ignition associated with a vehicle in which the IMU device is mounted upon; detecting motion; the expiration of a period of time; detecting an entry into a geo-fenced area; or receiving a request to calibrate the IMU device 102 from a client device 122.

At operation 404, responsive to detecting the trigger event, the device orientation calibration system 124 may perform a calibration operation upon the IMU device, as discussed in the method 300 depicted in FIG. 3.

The calibration operation may comprise one or more calibration operations in which the device orientation calibration system 124 orients a reference frame associated with the IMU device 102 with a reference frame associated with a vehicle. The calibration operations may include: determining a gravitational vector based on the IMU data; and determining a forward vector based on the IMU data. Accordingly, the device orientation calibration system may apply one or more rotations to the reference frame of the IMU device 102 in order to align the reference frame of the IMU device 102 with a reference frame of the vehicle.

FIG. 5 is a flowchart depicting a method 500 of calibrating an IMU device 102, according to certain example embodiments. Operations of the method 500 may be performed by the modules described above with respect to FIG. 2. In some embodiments, the method 500 may be performed as a subroutine of one or more operations of the method 300, such as operation 310, as well as operation 404 of the method 400. As shown in FIG. 5, the method 500 includes one or more operations 502, 504, and 506.

At operation 502, the IMU data module 202 accesses IMU data generated by the IMU device 102. As discussed above, the IMU device 102 may be mounted upon an object, such as a vehicle, wherein a reference frame of the IMU as indicated by the IMU data generated by the IMU device 102 may differ from that of the object or vehicle.

According to certain embodiments, the IMU data may comprise gyroscope data and accelerometer data, wherein the gyroscope data comprises left turn samples (i.e., datapoints) and right turn samples generated by a gyroscope associated with the IMU device 102, and the accelerometer data comprises a plurality of acceleration, deceleration, and turn samples (i.e., datapoints) generated by one or more sensors associated with the IMU device 102, such as a gyroscope, and accelerometer associated with the IMU device 102.

At operation 504, the IMU data module 202 generates a vector based on the accelerometer data datapoints. For example, in some embodiments, the system may perform a linear regression operation upon the accelerometer data datapoints to generate a vector. Having determined a vector based on the accelerometer data from among the IMU data, at operation 506 the IMU data module 202 determines a forward direction of the vector based on attributes of the left turn samples and right turn samples generated by the gyroscope.

For example, in some embodiments the left turn samples may correspond with a positive value, while the right turn samples may correspond with a negative value. The IMU data module 202 may measure left and right vectors by averaging the samples corresponding to left and right turns. With those vectors known, the IMU data module 202 may determine a forward direction of the vector generated based on accelerometer data.

The device orientation calibration module 124 may then calculate a yaw angle between the oriented forward vector and the X-axis of the gravity oriented reference frame associated with the vehicle, wherein the Z-axis is aligned with a direction of a gravitational vector, and the X and Y-axes are in an unknown orientation. The reference plane associated with the IMU device 102 may thereby be rotated based on the calculated yaw angle in order to fully orient the IMU device 102.

In some embodiments, the device orientation calibration system 124 may perform the yaw angle calculation continuously. Accordingly, if the calculated yaw angle differs by more than some threshold value (i.e., 10 degrees) from the previously calculated yaw angle, then a portion of, or the entire calibration operation may be performed again by the device orientation calibration system 124.

FIG. 6 is a diagram depicting a frame of reference of an IMU device 102, relative to a frame of reference associated with a vehicle, according to certain example embodiments. As seen in FIG. 6, the IMU device 102 may correspond with a frame of reference 606, wherein the axes of the frame of reference 606 are defined by the orientation of the IMU device 102 upon the vehicle.

As seen in the diagram 600, the frame of reference 604 associated with the vehicle 602 may differ greatly from the frame of reference 606 associated with the IMU device 102. The raw IMU data output by the IMU device 102 is attached to the reference frame 606. In order to acquire relevant IMU data from the IMU device 102, the reference frame 606 associated with the IMU device 102 must be rotated to align with the reference frame 604 associated with the vehicle 602.

Figure 7:
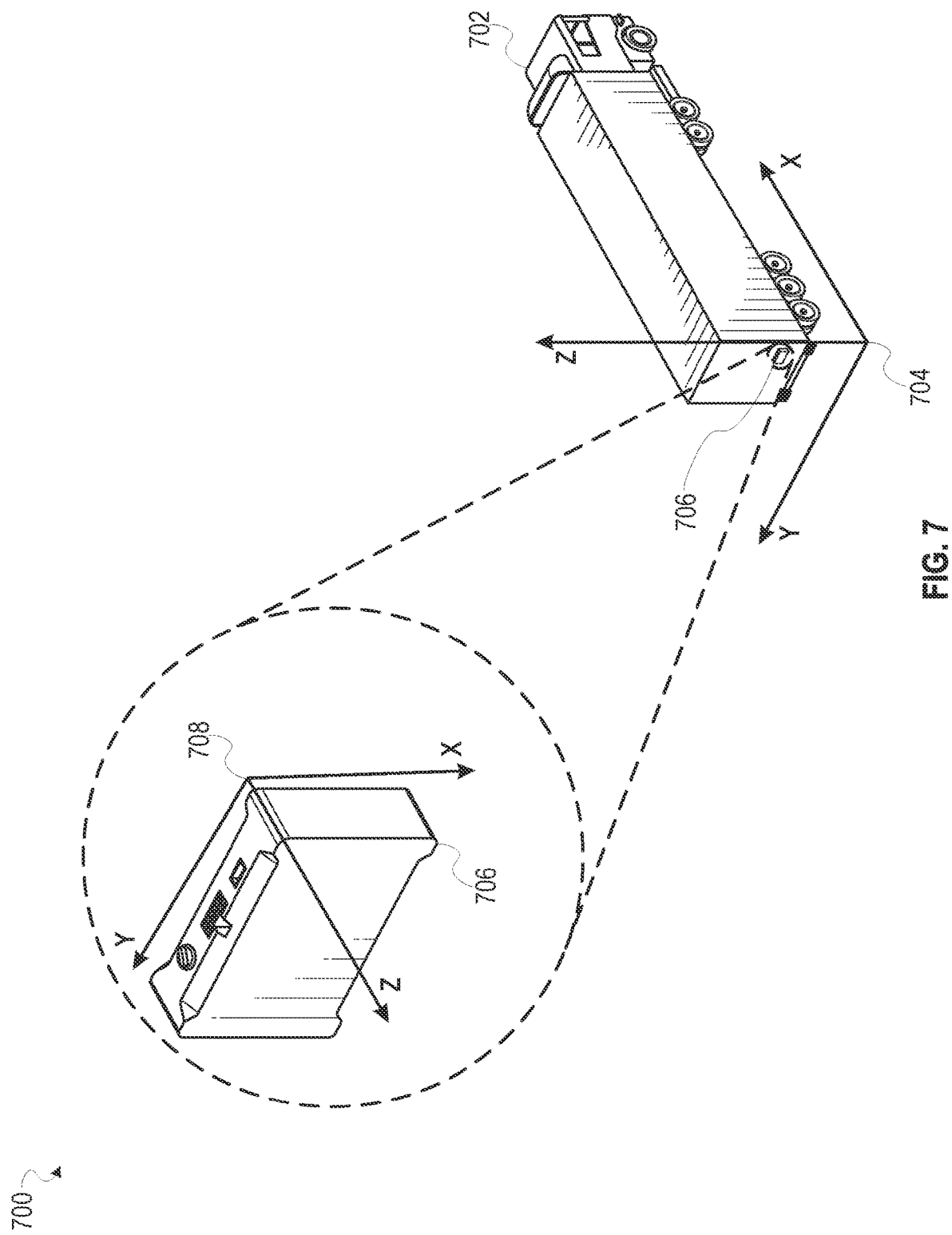
FIG. 7 is a flow diagram depicting a rotation applied to a reference frame of an IMU, according to certain example embodiments.

FIG. 7 is a diagram 700 depicting a rotation applied to a reference frame of an IMU device 102, according to certain example embodiments. As seen in the diagram 700 of FIG. 7, the reference frame 706, which may correspond with an IMU device 102, may be rotated to align with a reference frame of the vehicle 710, based on a gravitation vector 708, as discussed in operation 306 of the method 300 depicted in FIG. 3.

According to certain embodiments, gravity detection may be performed by the IMU module 202. Accordingly, by measuring a direction of the gravitational vector 708, the reference frame 706 associated with the IMU device 102 may be rotated such that the Z-axis coordinate frame of the reference frame 706 aligns with the gravitational vector 708. In other words, the Z-axis becomes aligned with the "up" direction of the "world" reference frame.

FIG. 8 is a diagram 800 depicting a rotation applied to a reference frame of an IMU device 102, according to certain example embodiments. As seen in the diagram 800, the reference frame 806, which may correspond with an IMU device 102, may be rotated to align an axes of the reference frame 806 with a forward motion vector 802 based on a yaw angle 804 calculated based on the IMU data, as discussed in the method 500 of FIG. 5.

Figure 9:
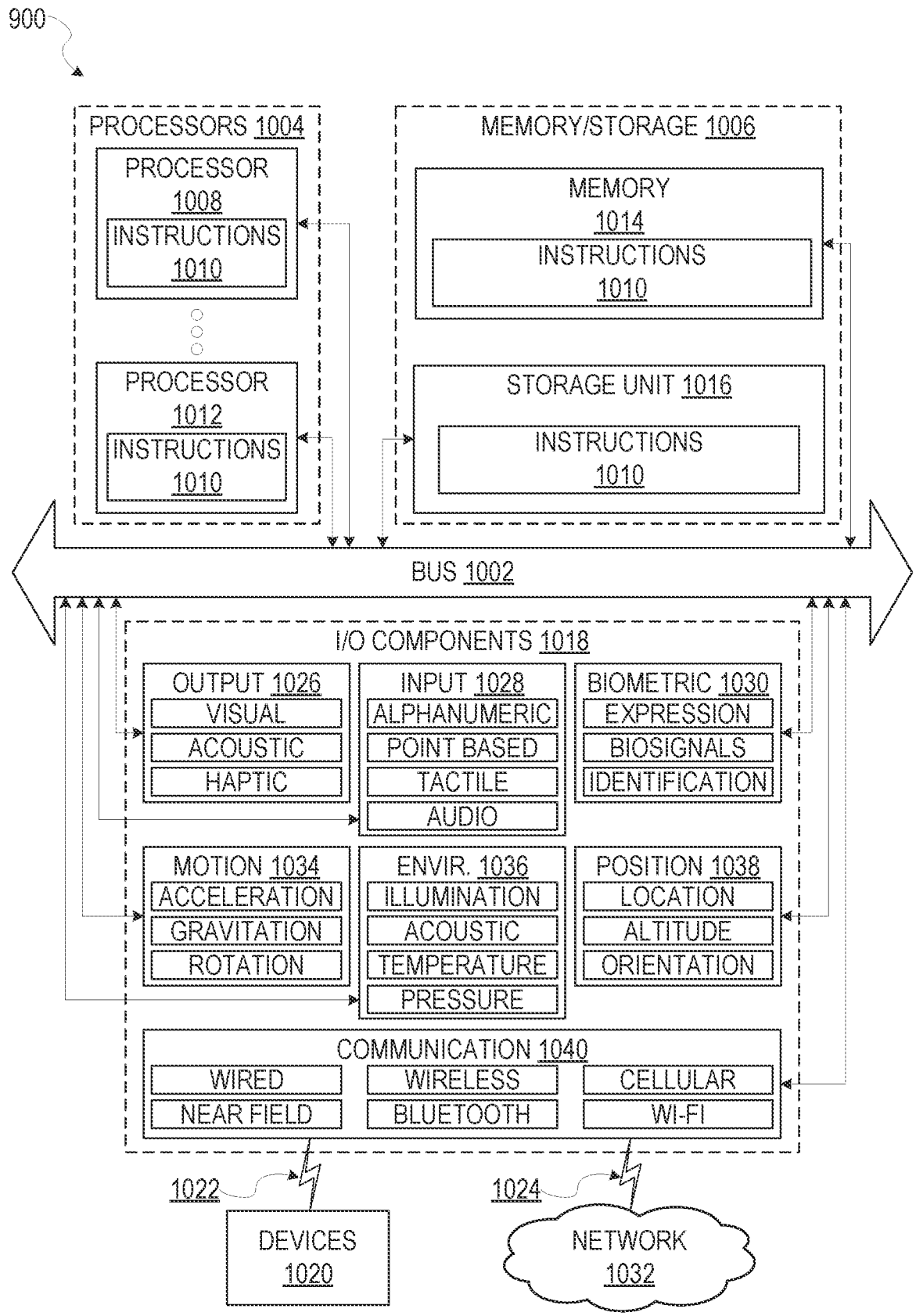
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental environment components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environment components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 922 and coupling 924 respectively. For example, the communication components 940 may include a network interface component or other suitable device to interface with the network 932. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a Universal Serial Bus (USB)).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

What is claimed is:

1. A method comprising:
accessing inertial measurement unit (IMU) data generated by an IMU mounted upon an object that corresponds with a first reference frame, the IMU data indicating a second reference frame that comprises a Z-axis, a Y-axis, and an X-axis;
performing a calibration of the IMU data to align the second reference frame of the IMU with the first reference frame of the object, the performing the calibration comprising:
determining a gravitational vector based on a first portion of the IMU data; applying a first rotation to the IMU data to align the Z-axis of the reference frame with the gravitational vector;
determining a forward motion vector based on a second portion of the IMU data that comprises gyroscope data and accelerometer data, the gyroscope data comprising left turn samples and right turn samples, and the determining the forward motion vector includes:
performing a first linear regression operation upon a first set of data points from among the gyroscope data to generate a vector; and
determining a forward direction of the vector based on values of the left turn samples and the right turn samples; and
applying a second rotation to the IMU data to align the X-axis of the reference frame with the forward motion vector.

2. The method of claim 1, wherein the IMU is mounted upon a vehicle.

3. The method of claim 1, wherein the IMU comprises one or more of an accelerometer and a gyroscope.

4. The method of claim 1, wherein the performing the calibration of the IMU data further comprises:
detecting a trigger event; and
performing the calibration of the IMU data responsive to the trigger event.

5. The method of claim 4, wherein the trigger event comprises:
detecting an activation of an ignition of the vehicle.

6. The method of claim 1, wherein the values corresponding with the right turn samples comprise a negative value, the values corresponding with the left turn samples comprise a positive value, and the determining the forward direction of the vector based on the values of the left turn samples and the right turn samples further comprises:
determining a yaw angle relative to the Z-axis of the second reference frame that corresponds with the IMU based on the negative value of the right turn samples, and the positive value of the left turn samples; and
determining the forward direction of the vector based on the yaw angle.

7. A system comprising:
a memory; and
at least one hardware processor to perform operations comprising:
accessing inertial measurement unit (IMU) data generated by an IMU mounted upon an object that corresponds with a first reference frame, the IMU data indicating a second reference frame that comprises a Z-axis, a Y-axis, and an X-axis;
performing a calibration of the IMU data to align the second reference frame of the IMU with the first reference frame of the object, the performing the calibration comprising:
determining a gravitational vector based on a first portion of the IMU data;

applying a first rotation to the IMU data to align the Z-axis of the reference frame with the gravitational vector;
determining a forward motion vector based on a second portion of the IMU data that comprises gyroscope data and accelerometer data, the gyroscope data comprising left turn samples and right turn samples, and the determining the forward motion vector includes:
  performing a first linear regression operation upon a first set of data points from among the gyroscope data to generate a vector; and
  determining a forward direction of the vector based on values of the left turn samples and the right turn samples; and
applying a second rotation to the IMU data to align the X-axis of the reference frame with the forward motion vector.

8. The system of claim 7, wherein the IMU is mounted upon a vehicle.

9. The system of claim 7, wherein the IMU comprises one or more of an accelerometer and a gyroscope.

10. The system of claim 7, wherein the performing the calibration of the IMU data further comprises:
  detecting a trigger event; and
  performing the calibration of the IMU data responsive to the trigger event.

11. The system of claim 10, wherein the trigger event comprises:
  detecting an activation of an ignition of the vehicle.

12. The system of claim 7, wherein the values corresponding with the right turn samples comprise a negative value, the values corresponding with the left turn samples comprise a positive value, and the determining the forward direction of the vector based on the values of the left turn samples and the right turn samples further comprises:
  determining a yaw angle relative to the Z-axis of the second reference frame that corresponds with the IMU based on the negative value of the right turn samples, and the positive value of the left turn samples; and
  determining the forward direction of the vector based on the yaw angle.

13. A non-transitory machine-readable storage medium comprising instructions that, when executed by one or more processors of a machine, cause the machine to perform operations comprising:

accessing inertial measurement unit (IMU) data generated by an IMU mounted upon an object that corresponds with a first reference frame, the IMU data indicating a second reference frame that comprises a Z-axis, a Y-axis, and an X-axis;
performing a calibration of the IMU data to align the second reference frame of the IMU with the first reference frame of the object, the performing the calibration comprising:
determining a gravitational vector based on a first portion of the IMU data;
applying a first rotation to the IMU data to align the Z-axis of the reference frame with the gravitational vector;
determining a forward motion vector based on a second portion of the IMU data that comprises gyroscope data and accelerometer data, the gyroscope data comprising left turn samples and right turn samples, and the determining the forward motion vector includes:
  performing a first linear regression operation upon a first set of data points from among the gyroscope data to generate a vector; and
  determining a forward direction of the vector based on values of the left turn samples and the right turn samples; and
applying a second rotation to the IMU data to align the X-axis of the reference frame with the forward motion vector.

14. The non-transitory machine-readable storage medium of claim 13, wherein the IMU is mounted upon a vehicle.

15. The non-transitory machine-readable storage medium of claim 13, wherein the IMU comprises one or more of an accelerometer and a gyroscope.

16. The non-transitory machine-readable storage medium of claim 13, wherein the performing the calibration of the IMU data further comprises:
  detecting a trigger event; and
  performing the calibration of the IMU data responsive to the trigger event.

17. The system of claim 16, wherein the trigger event comprises:
  detecting an activation of an ignition of the vehicle.

* * * * *